United States Patent
Kalina

(12) 
(10) Patent No.: US 9,556,793 B2
(45) Date of Patent: Jan. 31, 2017

(54) BOTTOMING CYCLE FOR AERODERIVATIVE TURBINE-BASED COMBINED POWER SYSTEMS AND METHODS FOR USING SAME

(71) Applicant: KALEX, LLC, Belmont, CA (US)

(72) Inventor: Alexander I. Kalina, Hillsborough, CA (US)

(73) Assignee: KALEX SYSTEMS LLC, Austin, TX (US)

( * ) Notice: Subject to any disclaimer, the term of this patent is extended or adjusted under 35 U.S.C. 154(b) by 718 days.

(21) Appl. No.: 13/787,498

(22) Filed: Mar. 6, 2013

(65) Prior Publication Data

US 2014/0250885 A1    Sep. 11, 2014

(51) Int. Cl.
*F02C 6/18* (2006.01)
*F01K 5/02* (2006.01)
*F01K 23/10* (2006.01)

(52) U.S. Cl.
CPC . *F02C 6/18* (2013.01); *F01K 5/02* (2013.01); *F01K 23/10* (2013.01); *Y02E 20/16* (2013.01)

(58) Field of Classification Search
CPC .......... F01K 23/10; F01K 25/065; F01K 5/02; Y02E 20/16; F02C 6/18
USPC ...... 60/649, 651, 655, 671, 673, 39.181, 39, 60/182
See application file for complete search history.

(56) References Cited

U.S. PATENT DOCUMENTS

| | | | | |
|---|---|---|---|---|
| 2007/0068161 A1* | 3/2007 | Kalina | ............ | F01K 25/065 60/651 |
| 2012/0317973 A1* | 12/2012 | Gulen | ............ | F01K 23/065 60/39.182 |

* cited by examiner

*Primary Examiner* — Hoang Nguyen
(74) *Attorney, Agent, or Firm* — Robert W Strozier

(57) ABSTRACT

Systems and methods for implementing the systems includes aeroderivative gas turbine subsystem and an energy extraction subsystem extracting energy from an exhaust of the aeroderivative gas turbine subsystem, where the energy extraction subsystem includes a heat exchange subsystem, a dual pressure turbine subsystem, and a condensation-thermal compression subsystem and where an intercooler portion of the heat recovery and vapor generator subsystem permits a working fluid flow rate to be increased to relative to a flow of the exhaust stream resulting in a bottoming cycle gross output increase of at least 23% relative a dual pressure Rankine cycle bottoming cycle, a bottoming cycle net output increase of at least 25% relative a dual pressure Rankine cycle bottoming cycle, a combined cycle net output increase of at least 5.5% relative a dual pressure Rankine cycle bottoming cycle, and a combined cycle efficiency increase to at least 54% relative to 51.1% for a dual pressure Rankine cycle bottoming cycle.

9 Claims, 5 Drawing Sheets

BOTTOMING CYCLE FOR AERODERIVATIVE TURBINE-BASED COMBINED POWER SYSTEMS AND METHODS FOR USING SAME

BACKGROUND OF THE INVENTION

1. Field of the Invention

Embodiments of this invention relate to systems and methods for implementing the systems, where the systems includes aeroderivative gas turbine subsystem and an energy extraction subsystem extracting energy from an exhaust of the aeroderivative gas turbine subsystem.

More particularly, embodiments of this invention relate to systems and methods for implementing the systems, where the systems includes aeroderivative gas turbine subsystem and an energy extraction subsystem extracting energy from an exhaust of the aeroderivative gas turbine subsystem, where the energy extraction subsystem includes a heat exchange subsystem, a dual pressure turbine subsystem, and a condensation subsystem.

2. Description of the Related Art

In distinction to systems including heavy duty turbines, systems including aeroderivative gas turbines have a higher compression ratio. As a result, an exhaust (flue gas) temperature from aeroderivative gas turbines is substantially lower than an exhaust temperature from heavy duty turbines.

Due to this lower exhaust temperature, it is not practically possible to reheat the working fluid in between the turbine stages of an aeroderivative turbine bottoming cycle. This results in a substantially lower overall efficiency of bottoming cycles for aeroderivative turbines as compared to bottoming cycles for heavy-duty turbines. The overall thermal efficiency for a conventional combined cycle using an aeroderivative turbine is on order of 50% to 53% as compared to a thermal efficiency of as much as 55% to 58% for a combined cycle using a heavy duty turbine.

Thus, there is a clear need in the art for a bottoming cycle for systems including aeroderivative turbines that would improve efficiencies of such systems relative to a Dual Pressure Rankine Cycle Bottoming Cycle (DPRC-SBC).

SUMMARY OF THE INVENTION

Embodiments of systems of this invention including an aeroderivative turbine subsystem for generating an exhaust stream, where the aeroderivative turbine subsystem may include one or a plurality of aeroderivative turbines and where the exhaust stream has a temperature between about 600° F. and 1000° F. The systems also include a heat exchange subsystem for heating a condensed working fluid stream producing a fully vaporized and superheated working fluid stream using heat from the exhaust stream and a stream from a higher pressure turbine unit of a dual pressure turbine subsystem. The dual pressure turbine subsystem converts a portion of thermal energy in the fully vaporized and superheated working fluid into a useable form of energy producing a spent working fluid stream, where heat from the stream from the higher pressure turbine is used to assist in the vaporization and superheating of the condensed working fluid stream. The systems also include a condensation subsystem for condensing the spent working fluid stream, where the condensation subsystem may be a condensation-thermal compression (CTCSS) or a simple recuperative condenser.

Embodiments of methods of this invention including combusting a fuel in an aeroderivative turbine subsystem and generating an exhaust stream. The methods also include transferring a portion of heat from the exhaust gas and a portion of heat from a stream from a higher pressure aeroderivative turbine of a dual pressure aeroderivative turbine subsystem to a condensed working fluid stream in a heat exchange subsystem producing a fully vaporized and superheated working fluid stream. The methods also include the step of converting a portion of thermal energy in the fully vaporized and superheated working fluid in a dual pressure turbine subsystem into a useable form of energy producing a spent working fluid stream. The methods also include a condensation subsystem for condensing the spent working fluid stream, where the condensation subsystem may be a condensation-thermal compression (CTCSS) or a simple recuperative condenser.

BRIEF DESCRIPTION OF THE DRAWINGS

The invention can be better understood with reference to the following detailed description together with the appended illustrative drawings in which like elements are numbered the same.

DEFINITIONS USED IN THE INVENTION

Figure 1:
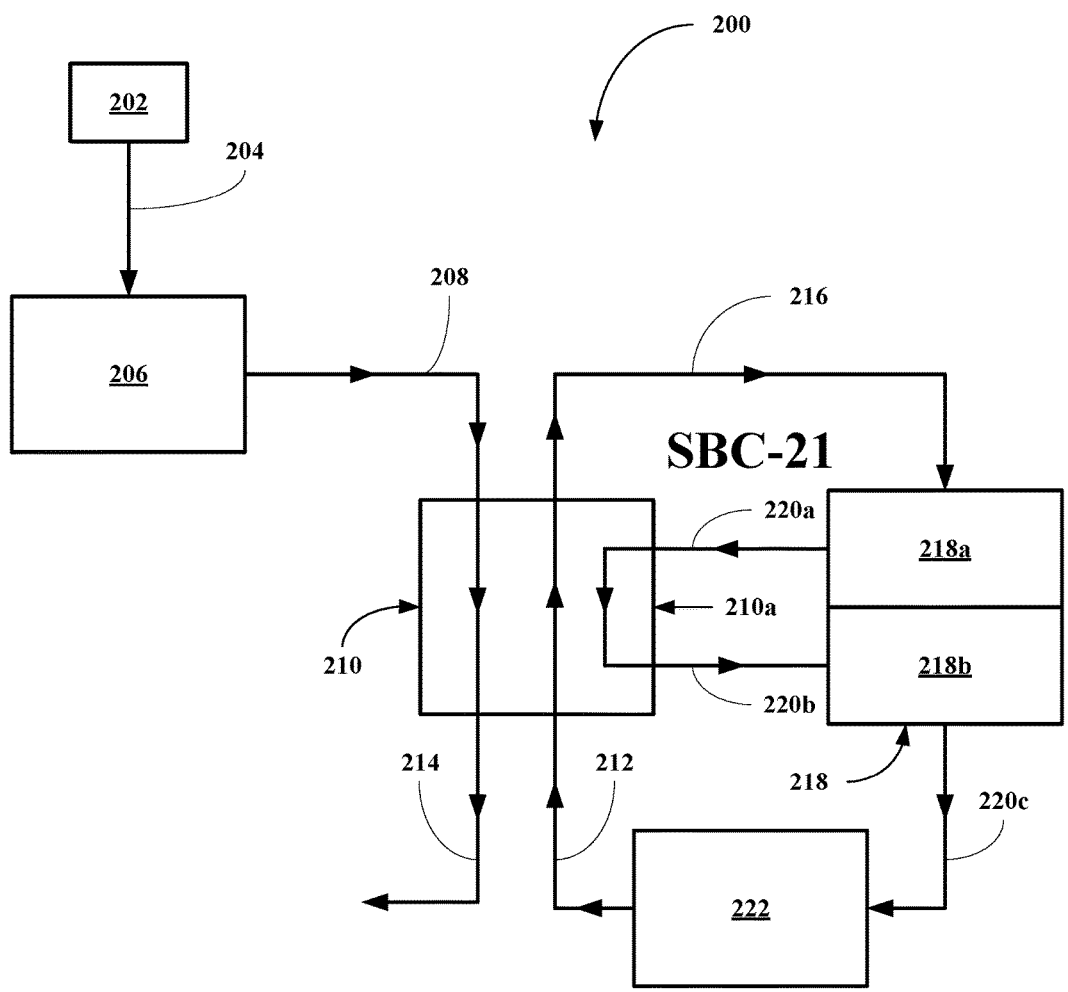
FIG. 1 depicts an embodiment of a system of this invention.

The term "substantially" means that the value of the value or property that the term modifies is within about 10% of the related value or property. In other embodiments, the term means that the value or property is within 5% of the related value or property. In other embodiments, the term means that the value or property is within 2.5% of the related value or property. In other embodiments, the term means that the value or property is within 1% of the related value or property.

DETAILED DESCRIPTION OF THE INVENTION

The inventor has found that systems and methods for implementing the systems using aeroderivative gas turbines may be constructed having improved efficiencies relative to a Dual Pressure Rankine Cycle Bottoming Cycle (DPRC-SBC). The present systems have increased power outputs and correspondingly thermal efficiencies of combined cycles using aeroderivative turbine subsystems relative to a DPRC-SBC. The inventor has found that the present systems may utilize any heat source stream besides an exhaust from one or more aeroderivative gas turbines having a temperature between about 600° F. and 1000° F. The present systems shows increased efficiencies up to about 30% compared to a dual pressure Rankine cycle bottoming cycle even if a condensation-thermal compression (CTCSS) is replaced with a simple recuperative condenser, where the improved efficiency would be reduced by 15% to 25% as compared to a 30% improvement compared to the dual pressure Rankine cycle bottoming cycle. The reduction in efficiency in going from a CTCSS to a simple recuperative condenser is due to the fact that the CTCSS gains the extra 15% efficiency by reducing back pressure on the lower pressure turbine. The other part of the improved efficiency is due to the use of a multi-component fluid and an intercooler, which increases heat needed to vaporize and superheat the upcoming working fluid from the CTCSS or the simple recuperative condenser.

Embodiments of methods of this invention for utilizing aeroderivative gas turbine exhaust comprising the steps of burning a fuel in an aeroderivative gas turbine subsystem to form an aeroderivative gas turbine exhaust stream. The aeroderivative gas turbine exhaust stream is then forwarded to a heat recovery and vapor generator (HRVG) subsystem. In the HRVG subsystem, thermal energy from the aeroderivative gas turbine exhaust stream and a spent higher pressure turbine working fluid stream or an intermediate pressure working fluid stream is transferred to a higher pressure condensed working fluid stream to form a spent aeroderivative gas turbine exhaust stream and a fully vaporized and superheated working fluid stream. The fully vaporized and superheated working fluid stream is then transferred to a dual pressure turbine (DPT) subsystem. In the dual pressure turbine subsystem, a portion of thermal energy in the fully vaporized and superheated working fluid stream is converted in a higher pressure turbine (HPT) portion into a first portion of a usable form of energy to form the intermediate pressure working fluid stream. The intermediate working fluid stream is then forwarded to an intercooler portion of the HRVG subsystem supplying additional thermal energy to fully vaporize and superheat the higher pressure condensed working fluid stream to form a cooled intermediate working fluid stream. The cooled intermediate pressure working fluid stream is then transferred to a lower pressure turbine (LPT) portion of the dual pressure turbine subsystem, where a portion of thermal energy in the cooled intermediate pressure working fluid stream is converted into a second portion of a usable form of energy to form a lower pressure or spent working fluid stream. The lower pressure or spent working fluid stream is condensed in a condensation subsystem into a condensed working fluid stream. A pressure of the condensed working fluid stream is then increased to form the higher pressure condensed working fluid stream. The higher pressure condensed working fluid stream is then forwarded to the HRVG subsystem. In certain embodiments, the fully vaporized and superheated working fluid stream is pressure adjusted to form a pressure adjusted fully vaporized and superheated working fluid stream before entering into the HPT of the dual pressure turbine subsystem.

In certain embodiment, the condensing step includes the steps of: (a) transferring heat from the lower pressure spent working fluid stream to a leaner solution liquid stream in a first heat exchange unit (HE1) to form a cooled spent working fluid stream and a partially vaporized leaner solution stream, (b) combining the cooled spent working fluid stream with a pressure adjusted lean solution stream in a throttle valve TV to from a basic solution stream, (c) transferring heat from the basic solution stream to a vaporizing basic solution stream in a second heat exchange unit (HE2) to form a condensing basic solution stream and a partially vaporized basic solution stream, (d) transferring heat from the condensing basic solution stream to a first higher pressure, fully condensed basic solution substream in a third heat exchange unit (HE3) to form a partially condensed basic solution stream and the vaporizing basic solution stream, (e) fully condensing the partially condensed basic solution stream in a condenser or fourth heat exchange unit (HE4) using a cooling media to form a fully condensed basic solution stream, (f) increasing a pressure of the condensed basic solution stream in a basic solution pump P5 to form a higher pressure condensed basic solution stream, (g) dividing the higher pressure condensed basic solution stream into the first higher pressure condensed basic solution substream and a second higher pressure condensed basic solution substream, (h) separating the partially vaporized basic solution stream in a second separator SP2 to form a rich vapor stream and the lean solution liquid stream, (i) separating the partially vaporized lean solution stream in a first separator SP1 to form a rich saturated vapor stream and a liquid leaner solution stream, (j) adjusting the pressure of the liquid leaner solution stream to form the pressure adjusted leaner solution stream, (k) combining the rich vapor stream and the rich saturated vapor stream to form a rich slightly wet vapor stream, (l) combining the rich slightly wet vapor stream and the second higher pressure condensed basic solution substream to form a working fluid stream, and (m) increasing a pressure of the working fluid stream in a third pump P3 to form the higher pressure working fluid stream. In other embodiments, the condensing step further includes the step of prior to increasing the pressure of the of the working fluid stream, fully condensing the working fluid stream with a cooling media to form a fully condensed working fluid stream. In other embodiments, the condenser HE4 fully condenses the partial condensed basic solution stream.

In other embodiment, the condensing step includes the steps of: (a) transferring heat from the lower pressure spent working fluid stream to a leaner solution liquid stream in a first heat exchange unit (HE1) to form a cooled spent working fluid stream and a partially vaporized leaner solution stream, (b) combining the cooled spent working fluid stream with a pressure adjusted lean solution stream in a throttle valve TV to from a basic solution stream, (c) transferring heat from the basic solution stream to a vaporizing basic solution stream in a second heat exchange unit (HE2) to form a condensing basic solution stream and a partially vaporized basic solution stream, (d) transferring heat from the condensing basic solution stream to a first higher pressure, fully condensed basic solution substream in a third heat exchange unit (HE3) to form a partially condensed basic solution stream and the vaporizing basic solution stream, (e) fully condensing the partially condensed basic solution stream in a condenser or fourth heat exchange unit (HE4) using a cooling media to form a fully condensed basic solution stream, (f) increasing a pressure of the condensed basic solution stream in a basic solution pump P5 to form a higher pressure condensed basic solution stream, (g) dividing the higher pressure condensed basic solution stream into the first higher pressure condensed basic solution substream and a second higher pressure condensed basic solution substream, (h) separating the partially vaporized basic solution stream in a second separator SP2 to form a rich vapor stream and the lean solution liquid stream, (i) separating the partially vaporized lean solution stream in a first separator SP1 to form a rich saturated vapor stream and a liquid leaner solution stream, (j) adjusting the pressure of the liquid leaner solution stream to form the pressure adjusted leaner solution stream, (k) combining the rich vapor stream and the rich saturated vapor stream to form a rich slightly wet vapor stream, (l) combining the rich slightly wet vapor stream and the second higher pressure condensed basic solution substream to form a working fluid stream, (m) condensing the working fluid stream with a cooling media to form a fully condensed working fluid stream, and (n) increasing a pressure of the fully condensed working fluid stream in a third pump P3 to form a higher pressure fully condensed working fluid stream. In other embodiments, the condenser HE4 fully condenses the partial condensed basic solution stream.

In other embodiment, the condensing step includes the steps of: (a) transferring heat from the lower pressure spent working fluid stream to a higher pressure condensed working fluid stream in a first heat exchange unit HE1 to form a cooled lower pressure spent working fluid stream and a heated higher pressure condensed working fluid stream, (b) condensing the cooled lower pressure spent working fluid stream in a condenser HE2 using a cooling media to form a condensed working fluid stream, and (c) increasing a pressure of the condensed working fluid stream in a working fluid pump P2 to form a higher pressure condensed working fluid stream. In certain embodiments, the condenser HE2 forms a fully condensed working fluid stream.

In certain embodiments, the wherein the working fluid comprises a multi-component fluid including at least one lower boiling point component and at least one higher boiling point component. In other embodiments, the multi-component fluid is selected from the group consisting of an ammonia-water mixtures, a mixture of two or more hydrocarbons, a mixture of two or more freons, a mixture of hydrocarbons and freons, and mixtures thereof. In other embodiments, the multi-component fluid comprises a mixture of water and ammonia.

Embodiments of the present invention also relate to systems for implementing the methods for condensing the spent working fluid as set forth above.

Suitable Reagents and Equipment

The working fluid used in the systems of this invention are multi-component fluids comprising a lower boiling point component and a higher boiling point component. Suitable multi-components fluids include, without limitation, ammonia-water mixtures, mixtures of two or more hydrocarbons, mixtures of two or more freon, mixtures of hydrocarbons and freons, or mixtures thereof. In general, the fluid may comprise mixtures of any number of compounds with favorable thermodynamic characteristics and solubility. In certain embodiments, the multi-component fluid comprises a mixture of water and ammonia.

It should be recognized by an ordinary artisan that at those points in the systems of this invention were a stream is split into two or more sub-streams, dividing valves that affect such stream splitting are well known in the art and may be manually adjustable or dynamically adjustable so that the splitting achieves the desired stream flow rates and system efficiencies. Similarly, when stream are combined, combining valve that affect combining are also well known in the art and may be manually adjustable or dynamically adjustable so that the splitting achieves the desired stream flow rates and system efficiencies.

SPECIFIC EMBODIMENTS

Total System

Referring now to FIG. 1, a conceptual flow diagram of an embodiment of a system of this invention, generally 200, is shown to include a fuel reservoir 202 connected via a fuel line 204 to an aeroderivative turbine subsystem 206 including one aeroderivative turbine or a plurality of aeroderivative turbines. The aeroderivative turbine subsystem 206 burns the fuel producing an exhaust stream that is forwarded via an exhaust stream line 208 to a heat exchange subsystem 210. The heat exchange subsystem 210 vaporizes and superheats a condensed working fluid stream supplied to the heat exchange subsystem 210 via a working fluid inlet line 212 to form spent exhaust stream, which is exhausted via an exhaust outlet line 214 and a fully vaporized and superheated working fluid stream, which leave the heat exchange subsystem 210 via a working fluid outlet line 216. The fully vaporized and superheated working fluid stream is then forwarded to a dual pressure turbine subsystem 218 having a higher pressure portion 218a and a lower pressure portion 218b. A portion of the thermal energy in the fully vaporized and superheated working fluid stream is converted to a first portion of a usable form of energy in the higher pressure turbine portion 218a producing an intermediate pressure working fluid stream, which is forwarded via an intermediate pressure working fluid outlet line 220a to an intercooler portion 210a of the heat exchange subsystem 210 to form a cooled intermediate pressure working fluid stream. The cooled intermediate pressure working fluid stream is forwarded via an intermediate pressure working fluid inlet line 220b to the lower pressure turbine portion 218b, where a portion of heat in the cooled intermediate pressure working fluid stream is converted to a second portion of a usable form of energy. In the heat exchange subsystem 210 a portion of heat from the exhaust stream and the intermediate pressure working fluid stream is used to fully vaporize and superheat the condensed working fluid stream to form a lower pressure working fluid stream, which is forwarded to a condensation subsystem 222 via a lower pressure working fluid line 220c. The spent working fluid stream is then condensed in the condensation subsystem 222 to form the condensed working fluid stream.

SBC-21 Bottoming Cycle

Figure 2:
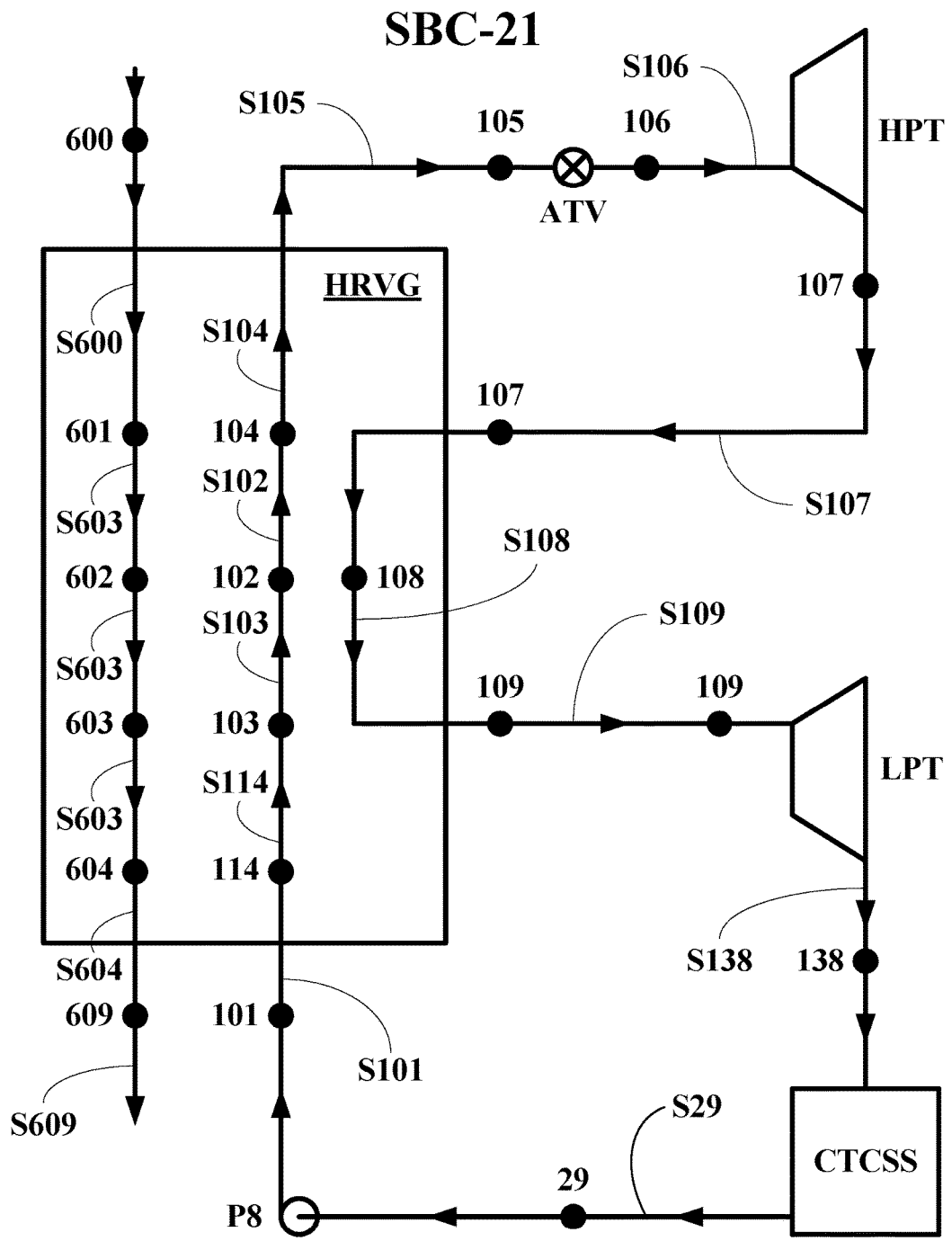
FIG. 2 depicts an embodiment of a bottoming cycle SBC-21 of this invention.

Referring now to FIG. 2, a conceptual flow diagram of an embodiment of a bottoming subsystem, generally SBC-21, of this invention is shown.

The system SBC-21 includes a heat recovery vapor generator (HRVG), a higher temperature aeroderivative turbine (HPT), a lower pressure aeroderivative turbine (LPT), and a condensation-thermal compression subsystem (CTCSS).

In the system SCB-21, a condensed and slightly preheated working fluid stream S29 having parameters as at a point 29, in a state of subcooled liquid, is sent into a main feed or eight pump P8, and pumped to an elevated pressure forming a liquid stream S101 having parameters as at a point 101 corresponding to a state of subcooled liquid.

The stream S101 is then sent into the Heat Recovery Vapor Generator (HRVG), where the stream S101 is consecutively heated by a flue gas heat source stream S600 having parameters as at a point 600. The process involves consecutive heat exchange process 600-609 or 101-105. After the consecutive heating, the working fluid stream S101 is converted into a vapor and then superheated exiting the HRVG as a superheated stream S105 having parameters as at a point 105, which is in a state of superheated vapor. In the consecutive heat exchange processes, the stream S101 is first heated in a heat exchange process 604-609 or 101-114 to form a spent flue gas stream S609 having parameters as at a point 609 and a pre-heated working fluid stream S114 having parameters as at a point 114. Next, the stream S114 is further heated in a heat exchange process 603-604 or 114-103 to form a cooler flue gas stream S603 having parameters as at a point 603 and a further heated working fluid stream S103 having parameters as at a point 103. Next, the stream S103 is partially vaporized in a heat exchange process 602-603 or 103-102 to form a partially cooler flue gas stream S602 having parameters as a point 602 and a partially vaporized stream S102 having parameters as at a point 102. Next, the partially vaporized stream S102 is vaporized in a heat exchange process 601-602 or 102-104 to form a cooled flue gas stream 601 having parameters as at a point 601 and a vaporized working fluid stream S104 having parameters as a point 104. Finally, the vaporizes stream S104 is superheated in a heat exchange process 600-601 or 104-105 to form a superheated working fluid stream S105 having parameters as at a point 105.

The superheated stream S105 is then sent through an admission throttle valve ATV, where its pressure is reduced to form a pressure adjusted stream S106 having parameters as at a point 106. The stream S106 is then forwarded to a higher pressure turbine HPT, where the stream S106 is expanded in the HPT converting a portion of the stream's thermal energy into a first portion of usable energy such as electrical power and forming an intermediate pressure stream S107 having parameters as at a point 107.

Thereafter, the stream S107 is sent back into the HRVG in counterflow with the stream S103, S102, S104, S601, S602, and S603 in heat exchange process 103-104, 601-603 or 107-109 forming in an intermediate cooled, intermediate pressure stream S108 having parameters as at a point 108 inside the HRVG. The stream S108 is further cooled in the HRVG to form a cooled intermediated pressure stream S109 having parameters as at a point 109. In certain embodiments, the stream S109 corresponds to a state of either saturated vapor or slightly superheated vapor. In other embodiments, the stream S109 corresponds to a state of dry saturated vapor.

The steam S109 is then sent into a low pressure turbine LPT, where the stream S109 is further expanded, converting a portion of its thermal energy into a second portion of usable energy such as electrical power to form a spent working fluid stream S138 having the parameters as at the point 138, corresponding to a state of wet vapor.

The stream S138 is then sent into the condensation-thermal compression subsystem CTCSS (as described below) exiting the CTCSS as the stream S29 having the parameters as at the point 29.

In heat exchange process 107-109, the working fluid vapor stream S107 is cooled in an intercool process providing additional heat to the flue gas streams S601, S602 and S603. This additional heat is then transferred from the flue gas to the working fluid stream S103, S102 and S104 (as described above.)

The additional heat provided to the flue gas in heat exchange process 107-109 allows for an increase in a flow rate of the streams S101, S114, S103, S102, S104 and S105 without needing to increase a flow rate of the flue gas heat source streams S600, S601, S602, S603, S604 and S609. This avoids a temperature cross between the flue gas heat source and the working fluid, i.e., a temperature of the heat source is higher at every point than a temperature of the working fluid at the corresponding point in the HRVG. This increase in the flow rate of the working fluid results in a substantial increase in the power output of the HPT and LPT turbines and therefore increases the total power output of the system SBC-21.

The overall increase in the power output in the system SBC-21 as a whole is much larger than the loss of power output in the LPT that results due to the intercool process 107-109, which does result in a lower temperature of the working fluid entering the LPT turbine (with the S109 having the parameters as at the point 109) than would have been the case if there had been no intercooling.

Meanwhile the heat source S600, which is an exhaust flue gas from a gas turbine and has the parameters as at the point 600, enters into the HRVG, providing heat for the processes of pre-heating, vaporization and superheating of the working fluid S101 as described above.

Specifically, the stream S600 is cooled in counterflow with the working fluid stream S104 and first forming the stream S601 having the parameters as at the point 601 and providing heat for heat exchange process 104-105 or 600-601. Thereafter, the stream S601 is further cooled in the heat exchange process 601-603 or 103-104, in counter-flow with the stream S103, while at the same time heated by stream S107. Thus, the total heat released by the flue gas in heat exchange process 601-603 and by the working stream in the heat exchange process 107-109 is all transferred to the working fluid stream S103 in the heat exchange process 103-104.

Thereafter, the stream S603 is further cooled in the heat exchange process 603-609, obtaining a flue gas stream S604 having the intermediate parameters as at the point 604 in the course of this processes and providing heat for the heat exchange process 101-103, and exits the HRVG as the stream S609 having the parameters as at the point 609.

A total quantity of heat supplied to the working fluid streams S101, S103, S102, S104 and S105 is equal to a sum total of heat released by the flue gas streams S600, S601, S602, S603, S604 and S609 and the heat released by the intercooled working fluid stream S107. Thus, the total quantity of heat is larger than the heat released from the flue gas and this allows an increase in the flow rate of the working fluid into the turbines, thus increasing the total power produced.

Condensation-Thermal Compression Subsystem

Figure 3:
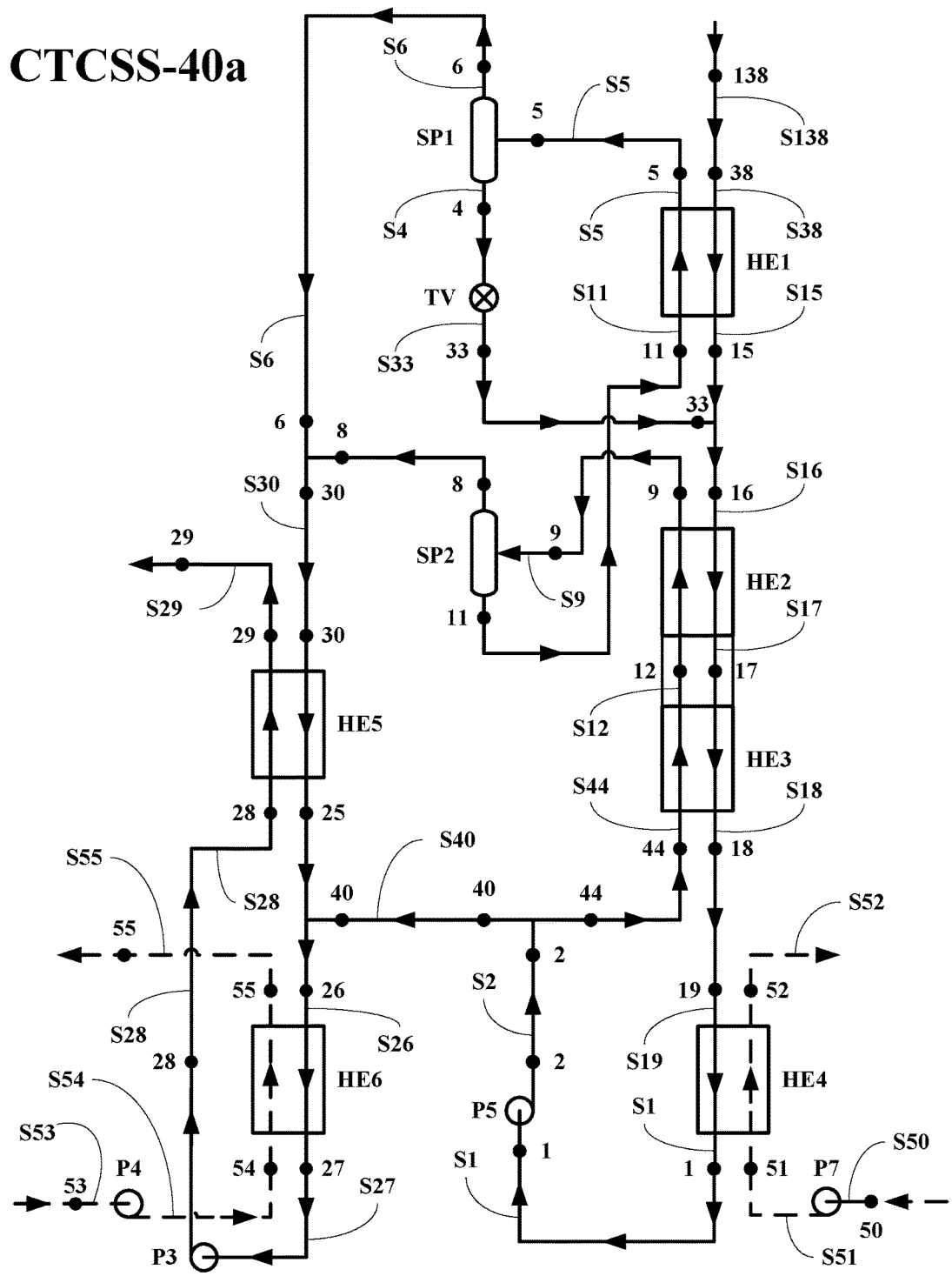
FIG. 3 depicts an embodiment of a condensation-thermal compression (CTCSS) of this invention.

Referring now to FIG. 3, a conceptual flow diagram of an embodiment of a condensation-thermal compression subsystem of this invention, generally CTCSS-40a, is shown. The CTCSS-40a operates in such as way that the working fluid stream S138 having the parameters as the point 138 enters into the CTCSS-40a, where it is redesignated as a stream S38 having parameters as a point 38. The stream S38, corresponding to a state of wet vapor, passes through an initial condenser or first heat exchange unit HE1, where it releases heat in a heat exchange process 38-15 or 11-5 to form a cooled working fluid stream S15 having parameters as at a point 15, corresponding to a state of wet vapor.

The stream S15 is then combined with a lean stream S33 having parameters as at a point 33 to form a mixed vapor-liquid basic solution stream S16 having parameters as at a point 16.

The stream S16 is then sent into a second condenser or second heat exchange unit HE2, where it is cooled and further condensed to form further condensed basic solution stream S17 having parameters as at a point 17. The stream S17 then passes through a condenser or third heat exchange unit HE3, where it is yet further cooled and condensed, releasing heat and forming a further condensed basic solution stream S18 having parameters as at a point 18, which corresponds to a state of a vapor-liquid mixture.

The stream S18 is now redesignated as a basic solution stream S19 having parameters as at a point 19. The stream S19 is then sent through a final condenser or fourth heat exchange unit HE4, where it is cooled and fully condensed in counterflow by a cooling media stream S51 in a heat exchange process 51-52 (as described below) to form a spent cooling media stream S52 having parameters as at a point 52 and a fully condensed basic solution stream S1 having parameters as at a point 1, which corresponds to a state of fully condensed, saturated liquid. A temperature of the basic solution stream S1 at the point 1 depends upon an initial temperature of the cooling media stream S51 at the point 51.

The compositions of the streams S16, S17, S18, S19 and 51 at the points 16, 17, 18, 19 and 1 are substantially leaner (i.e., the streams contains a lower proportion of the lower-boiling component—ammonia) than the working fluid stream S38 or S138. As a result, a pressure of the stream S1 at the point 1 is substantially lower than a pressure that would be required to condense the stream S38 having the composition as at the points 38 or 138. This results in a reduction in a back pressure at the LPT turbine and a power output of the LPT turbine is substantially increased.

The basic solution stream S1 now enters into a circulating pump or fifth P5, where its pressure is increased, to form a higher pressure fully condensed basic solution stream S2 having parameters as at a point 2, which corresponds to a state of subcooled liquid.

Thereafter, the basic solution stream S2 is divided into two basic solution substreams S40 and S44 having parameters as at points 44 and 40. The stream S44 is then sent back into the third heat exchange unit HE3, where it is heated, in counter-flow with the basic solution stream S17 in the heat exchange process 17-18 (as described above) to form a heated basic solution stream S12 having parameters as at a point 12, which corresponds to a state of saturated liquid.

The basic solution stream S12 is then sent into the second heat exchange unit HE2, where it is heated and partially vaporized in counter-flow with the basic solution stream S16 in the heat exchange process 16-17 (as describe above) to form a partially vaporized basic solution stream S9 having parameters as at a point 9, which corresponds to a state of vapor-liquid mixture.

The basic solution stream S9 is then sent into a second gravity separator SP2, where it is separated into a rich vapor stream S8 having parameters as at a point 8, and a saturated liquid stream S11 having parameters as at a point 11. The composition of the saturated liquid stream S11 at the point 11 is leaner than the basic solution.

The leaner saturated liquid stream S11 is then sent into the first heat exchange unit HE1, where it is heated and partially vaporized, in counter-flow with the working fluid stream S38 in the heat exchange process 38-15 (as described above) to form a leaner vapor-liquid stream S5 having parameters as at a point 5, which corresponds to a state of vapor-liquid mixture.

The leaner vapor-liquid stream S5 is then sent into a first gravity separator SP1, where it is separated into a rich saturated vapor stream S6 having parameters as at a point 6 and a lean saturated liquid stream S4 having parameters as at a point 4.

The lean saturated liquid stream S4 is then sent through a throttle valve TV, where its pressure is reduced to a pressure equal a pressure of the working fluid stream S15 at the point 15, to form a lower pressure lean stream S33 having the parameters as at the point 33. The stream S33 is then mixed with the working fluid stream S15, forming the basic solution stream S16 (as described above.)

Meanwhile, the rich saturated vapor stream S6 exits the first separator SP1 and is combined with the rich vapor stream S8 exiting the second separator SP2 forming a rich, slightly wet vapor stream S30 with parameters as at a point 30. The concentration of the lower boiling component in streams S6, S8 and S30 is substantially higher than in the working fluid streams S138 and S38.

The stream S30 is then sent through a recuperative heat exchanger or fifth heat exchange unit HE5, where it is cooled and partially condensed, releasing heat for a heat exchange process 28-29 or 30-25 to form a partially condensed rich stream S25 having parameters as at a point 25.

The stream S25 is now mixed with the basic solution substream S40 (as describe above) to form a mixed stream S26 having parameters as at a point 26, which corresponds to a state of liquid-vapor mixture. A ratio of amount of the streams S25 and the stream S40 is chosen in such a way that a composition of the mixed stream S26 at the point 26 is the same as a composition of the working fluid stream S138/S38.

The working fluid stream S26 is now sent though a high pressure final condenser or a sixth heat exchange unit HE6, where it is cooled, in counter-flow with a second cooling media stream S54 in a heat exchange process 54-55 (as described below) to form a fully condensed working fluid stream S27 having parameters as at a point 27, which corresponds to a state of saturated, fully condensed liquid and a spent second cooling media stream S55.

The fully condensed working fluid stream S27 is then sent into a third pump P3, where it is pumped to an intermediate pressure to form an intermediate pressure fully condensed working fluid stream S28 having parameters as at a point 28.

The intermediate pressure fully condensed working fluid S28 then passes though the fifth heat exchange unit HE5, where it is heated by the stream S30 in the heat exchange process 30-25 or 28-29 to form the working fluid stream S29 having the parameters as at the point 29, exiting the CTCSS-40a and returning to the main power system SBC-21, which is then forwarded to the feed pump P8 as described above.

The cooling media for use in the CTCSS-40a may comprises streams S50 and S53 having initial parameters as at points 50 and point 53, which may be pumped to a required pressure by a seventh pump P7 and a fourth pump P4, respectively, to form the cooling media streams S51 and S54 having the parameters as at the point 51 and 54, respectively. These cooling media streams S51 and S54 then enter into the fourth heat exchange unit HE4 and the sixth heat exchange unit HE6 and form the spent cooling media streams S52 and S55 having the parameters as at the points 52 and 55, respectively Alternately, the cooling media stream S50 having the parameters as at the point 50 may be pumped to the required pressure in a single pump and then divided into the two streams S51 and S54, having the parameters as at point 51 and 54.

Figure 4:
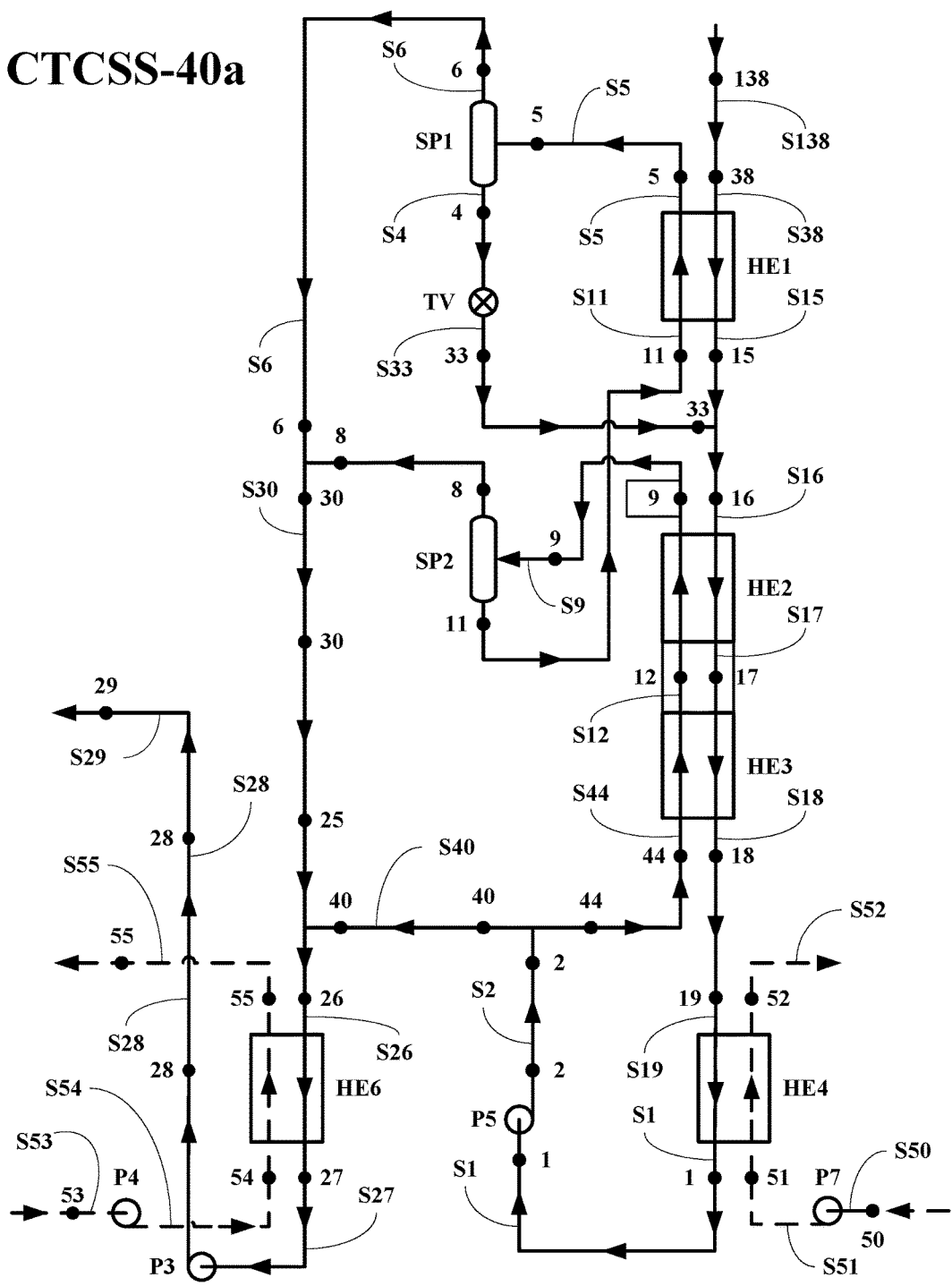
FIG. 4 depicts another embodiment of a condensation-thermal compression (CTCSS) of this invention.

It is possible to exclude the fifth heat exchange unit HE5 from the CTCSS-40a and send the stream S28 directly into the main system SBC-21 and into the feed pump or the eight pump P8 as shown in FIG. 4. This alternate embodiment would result in a reduction of a temperature the stream S101 at the point 101 (upon entry into the HRVG.) This may cause condensation of the water vapor that is contained in the flue gas streams S600-S609. If the flue gas contains no sulfur or very little sulfur, this is acceptable. But if there is any substantial amount of sulfur in the flue gas, this should be avoided and the fifth heat exchange unit HE5 should not be excluded from the CTCSS-40a.

Recuperative Condenser Subsystem

Figure 5:
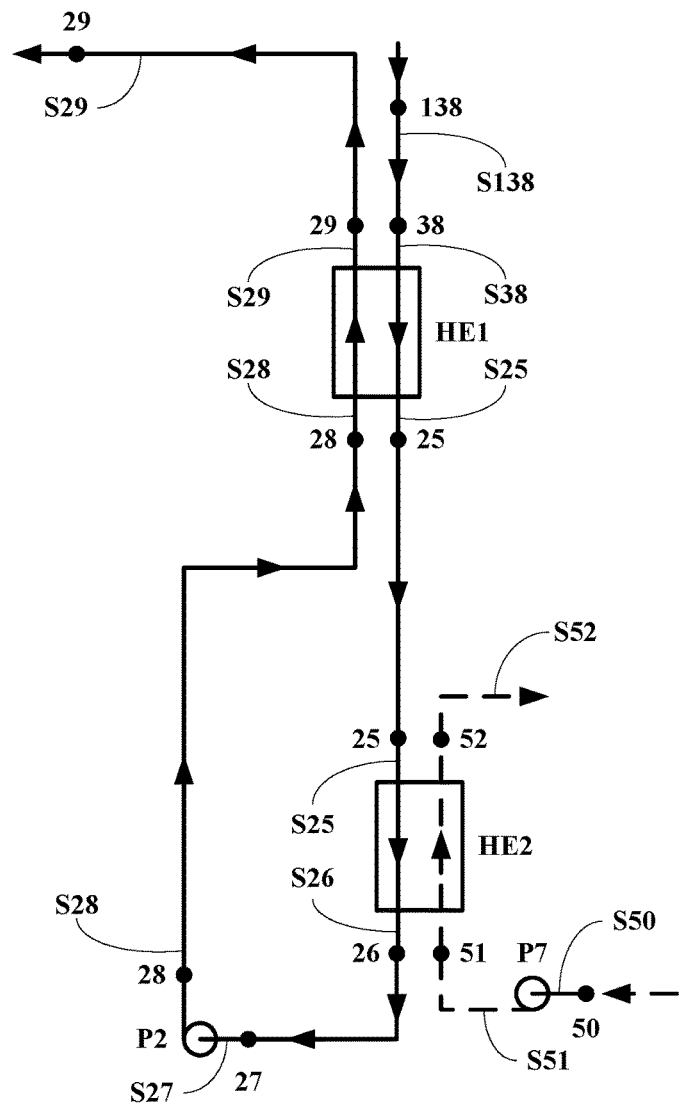
FIG. 5 depicts an embodiment of a simple recuperative condenser.

Referring now to FIG. 5, a conceptual flow diagram of an embodiment of a recuperative condenser subsystem, RCSS, is shown to include a first heat exchange unit HE1, where heat or thermal energy in the lower pressure spent working fluid stream S138 having the parameters as at the point 138 or the stream S38 and having the parameters as the point 38 is transferred to a higher pressure fully condensed working fluid stream S28 having parameters as at a point 28 to form a heated higher pressure fully condensed working fluid stream S29 having the parameters as at the point 29 and a cooled lower pressure working fluid stream S25 having parameter as at a point 25. The cooled lower pressure working fluid stream S25 is then forwarded to a condenser or second heat exchange unit HE2, where the cooled lower pressure working fluid stream S25 is fully condensed using a coolant media stream S51 having parameter as at a point 51 to form a lower pressure fully condensed working fluid stream S26 or S27 having parameters as at point 26 or 27 respectively and a spent coolant media stream S52 having parameters as at a point 52. The lower pressure fully condensed working fluid stream S27 having parameters as at a point 27 is then forwarded to a second pump P2, where its pressure is increased to form the higher pressure, fully condensed working fluid stream S28. As in the case of the CTCSS-40a embodiments, the coolant media stream S51 may be water or air and the stream S51 may be pumped to a higher pressure if water or increased in pressure using a fan if air, thus an initial coolant stream S50 having parameters as at a point 50 is pumped to a higher pressure in a seven pump P7 to form an increased pressure coolant stream S51.

Improved Output and Efficiency Calculations

The present system SBC-21 substantially outperforms conventional dual-pressure Rankine cycle systems normally as a bottoming cycle for systems including aeroderivative gas turbines. A comparison of the performance of the present system with a dual Rankine cycle system is given in Table 1. This comparison is based on the use of the systems as bottoming cycles for a LM 6000 PC SPRINT 50 Hz gas turbine. Data on the performance of a combined cycle with the turbine given above and a dual-Rankine cycle bottoming cycle are taken from the 2010 *Gas Turbine World Handbook*.

The overall efficiency of the combined cycle with the present system SBC-21 as a bottoming cycle is 54.5%. This makes a combined cycle with an aeroderivative turbine almost equal in efficiency with a combined cycle with heavy-duty heavy duty turbines.

TABLE 1

SBC-21 versus Dual Pressure Rankine Cycle Bottoming Cycle (DPRC-SBC)

| Property | DPRC-SBC | SBC-21 | % increase SBC-21 vs. DPRC-SBC |
|---|---|---|---|
| Gas Turbine Gross Output | 50,836 kW | 50,836 kW | NA |
| Gas Turbine Net Output | 50,526 kW | 50,526 kW | NA |
| Bottoming Cycle Gross Output | 15,051 kW | 19,266 kW | +28.0% |
| Bottoming Cycle Net Output | 14,073 kW | 18,338 kW | +30.3% |
| Combined Cycle Net Output | 64,599 kW | 68,864 kW | +6.6% |
| Combined Cycle Efficiency % | 51.1% | 54.5% | |

All references cited herein are incorporated by reference. Although the invention has been disclosed with reference to its preferred embodiments, from reading this description those of skill in the art may appreciate changes and modification that may be made which do not depart from the scope and spirit of the invention as described above and claimed hereafter.

I claim:

1. A method for utilizing aeroderivative gas turbine exhaust comprising the steps of:
    burning a fuel in an aeroderivative gas turbine subsystem to form an aeroderivative gas turbine exhaust stream,
    transferring a portion of heat or thermal energy from the aeroderivative gas turbine exhaust stream and an intermediate pressure working fluid stream in a heat recovery and vapor generator subsystem to an increased pressure condensed working fluid stream to form a spent aeroderivative gas turbine exhaust stream and a fully vaporized and superheated increased pressure working fluid stream,
    converting a portion of heat or thermal energy in the fully vaporized and superheated increased pressure working fluid stream into a first portion of a usable form of energy in a higher pressure turbine unit of a dual pressure turbine subsystem to form the intermediate pressure working fluid stream,
    forwarding the intermediate pressure working fluid stream into an intercooler portion of the heat recovery and vapor generator subsystem providing additional heat to fully vaporize and superheat the increased pressure condensed working fluid stream to form a cooled intermediate pressure working fluid stream,
    converting a portion of heat or thermal energy in the cooled intermediate pressure working fluid stream into a second portion of a usable form of energy in a lower pressure turbine unit of the dual pressure turbine subsystem to form a lower pressure spent working fluid stream,
    transferring heat from the lower pressure spent working fluid stream to a condensed higher pressure working fluid stream in a first heat exchange unit to form a cooled lower pressure spent working fluid stream and a heated condensed higher pressure working fluid stream,
    condensing the cooled lower pressure spent working fluid stream in a recuperative condenser using a cooling media to form a condensed lower pressure working fluid stream,
    increasing a pressure of the condensed lower pressure working fluid stream to form the condensed higher pressure working fluid stream, and
    increasing a pressure of the heated condensed higher pressure working fluid stream to form the increased pressure condensed working fluid stream,
    where the intercooler portion of the heat recovery and vapor generator subsystem permits a working fluid flow rate to be increased relative to a flow rate of the exhaust stream resulting in a) a bottoming cycle gross output increase of at least 23% relative to a dual pressure Rankine cycle bottoming cycle, b) a bottoming cycle net output increase of at least 25% relative to a dual pressure Rankine cycle bottoming cycle, c) a combined cycle net output increase of at least 5.5% relative to a dual pressure Rankine cycle bottoming cycle, and d) a combined cycle efficiency increase of at least 54% relative to 51.1% for a dual pressure Rankine cycle bottoming cycle.

2. The method of claim 1, wherein the working fluid comprises a multi-component fluid including at least one lower boiling point component and at least one higher boiling point component, where the components are selected from the group consisting of an ammonia-water mixture, a mixture of two or more hydrocarbons, a mixture of two or more freons, and a mixture of hydrocarbons and freons.

3. The method of claim 2, wherein the multi-component fluid comprises a mixture of water and ammonia.

4. A method for utilizing aeroderivative gas turbine exhaust comprising the steps of:
    burning a fuel in an aeroderivative gas turbine subsystem to form an aeroderivative gas turbine exhaust stream, transferring a portion of heat or thermal energy from the aeroderivative gas turbine exhaust stream and an intermediate pressure working fluid stream in a heat recovery and vapor generator subsystem to an increased pressure condensed working fluid stream to form a spent aeroderivative gas turbine exhaust stream and a fully vaporized and superheated increased pressure working fluid stream, converting a portion of heat or thermal energy in the fully vaporized and superheated increased pressure working fluid stream into a first portion of a usable form of energy in a higher pressure turbine unit of a dual pressure turbine subsystem to form the intermediate pressure working fluid stream, forwarding the intermediate pressure working fluid stream into an intercooler portion of the heat recovery and vapor generator subsystem providing additional heat to fully vaporize and superheat the condensed working fluid stream to form a cooled intermediate pressure working fluid stream, converting a portion of heat or thermal energy in the cooled intermediate pressure working fluid stream into a second portion of a usable form of energy in a lower pressure turbine unit of the dual pressure turbine subsystem to form a lower pressure spent working fluid stream, transferring heat from the lower pressure spent working fluid stream to a liquid lean solution stream in a first heat exchange unit to form a cooled lower pressure spent working fluid stream and a partially vaporized lean solution stream, combining the cooled lower pressure spent working fluid stream with a pressure adjusted leaner solution stream to form a lower pressure basic solution stream, transferring heat from the lower pressure basic solution stream to a vaporizing higher pressure basic solution stream in a second heat exchange unit to form a condensing lower pressure basic solution stream and a partially vaporized higher pressure basic solution stream, transferring heat from the condensing lower pressure basic solution stream to a first higher pressure condensed basic solution substream in a third heat exchange unit to form a partially condensed lower pressure basic solution stream and the vaporizing higher pressure basic solution stream, condensing the partially condensed lower pressure basic solution stream with the cooling media to form a condensed lower pressure basic solution stream, increasing a pressure of the condensed lower pressure basic solution stream in a basic solution pump to form a condensed higher pressure basic solution stream, dividing the condensed higher pressure basic solution stream into the first condensed higher pressure basic solution substream and a second condensed higher pressure basic solution substream, separating the partially vaporized lower pressure basic solution stream in a second separator to form a rich vapor stream and the lean solution stream, separating the partially vaporized lean solution stream in a first separator to form a rich saturated vapor stream and a liquid leaner solution stream, adjusting the pressure of the liquid leaner solution stream to form the pressure adjusted leaner solution stream, combining the rich vapor stream and the rich saturated vapor stream to form a rich slightly wet vapor stream, combining the rich slightly wet vapor stream and the second condensed higher pressure basic solution substream to form a lower pressure working fluid stream, condensing the lower pressure working fluid stream to form a condensed lower pressure working fluid stream, increasing a pressure of the condensed lower pressure working fluid stream to form the condensed higher pressure working fluid stream, and increasing a pressure of the heated condensed higher pressure working fluid stream to form the increased pressure condensed working fluid stream, where the intercooler portion of the heat recovery and vapor generator subsystem permits a working fluid flow rate to be increased relative to a flow rate of the exhaust stream resulting in a bottoming cycle gross output increase of at least 23% relative to a dual pressure Rankine cycle bottoming cycle, a bottoming cycle net output increase of at least 25% relative to a dual pressure Rankine cycle bottoming cycle, a combined cycle net output increase of at least 5.5% relative to a dual pressure Rankine cycle bottoming cycle, and a combined cycle efficiency increase of at least 54% relative to 51.1% for a dual pressure Rankine cycle bottoming cycle.

5. The method of claim 4, wherein the working fluid comprises a multi-component fluid including at least one lower boiling point component and at least one higher boiling point component, where the components are selected from the group consisting of an ammonia-water mixture, a mixture of two or more hydrocarbons, a mixture of two or more freons, and a mixture of hydrocarbons and freons.

6. The method of claim 5, wherein the multi-component fluid comprises a mixture of water and ammonia.

7. A method for utilizing aeroderivative gas turbine exhaust comprising the steps of:
burning a fuel in an aeroderivative gas turbine subsystem to form an aeroderivative gas turbine exhaust stream, transferring a portion of heat or thermal energy from the aeroderivative gas turbine exhaust stream and an intermediate pressure working fluid stream in a heat recovery and vapor generator subsystem to an increased pressure condensed working fluid stream to form a spent aeroderivative gas turbine exhaust stream and a fully vaporized and superheated working fluid stream, converting a portion of heat or thermal energy in the fully vaporized and superheated working fluid stream into a first portion of a usable form of energy in a higher pressure turbine unit of a dual pressure turbine subsystem to form the intermediate pressure working fluid stream, forwarding the intermediate pressure working fluid stream into an intercooler portion of the heat recovery and vapor generator subsystem providing additional heat to fully vaporize and superheat the condensed working fluid stream to form a cooled intermediate pressure working fluid stream, converting a portion of heat or thermal energy in the cooled intermediate pressure working fluid stream into a second portion of a usable form of energy in a lower pressure turbine unit of the dual pressure turbine subsystem to form a lower pressure spent working fluid stream, transferring heat from the lower pressure spent working fluid stream to a liquid lean solution stream in a first heat exchange unit to form a cooled spent working fluid stream and a partially vaporized lean solution stream, combining the cooled spent working fluid stream with a pressure adjusted leaner solution stream to from a lower pressure basic solution stream, transferring heat from the lower pressure basic solution stream to a vaporizing higher pressure basic solution stream in a second heat exchange unit to form a condensing lower pressure basic solution stream and a partially vaporized higher pressure basic solution stream, transferring heat from the condensing lower pressure basic solution stream to a first higher pressure fully condensed basic solution substream in a third heat exchange unit to form a partially condensed lower pressure basic solution stream and the vaporizing higher pressure basic solution stream, condensing the partially condensed lower pressure basic solution stream with a cooling media to form a fully condensed lower pressure basic solution stream, increasing a pressure of the fully condensed lower pressure basic solution stream in a basic solution pump to form a fully condensed higher pressure basic solution stream, dividing the fully condensed higher pressure basic solution stream into the first fully condensed higher pressure basic solution substream and a second fully condensed higher pressure basic solution substream, separating the partially vaporized higher pressure basic solution stream in a second separator to form a rich vapor stream and the lean solution stream, separating the partially vaporized lean solution stream in a first separator to form a rich saturated vapor stream and a liquid leaner solution stream, adjusting the pressure of the liquid leaner solution stream to form the pressure adjusted leaner solution stream, combining the rich vapor stream and the rich saturated vapor stream to form a rich slightly wet vapor stream, combining the rich slightly wet vapor stream and the second fully condensed higher pressure basic solution substream to form a working fluid stream, condensing the working fluid stream with a cooling media to form a fully condensed working fluid stream, increasing a pressure of the fully condensed working fluid stream to form a condensed higher pressure working fluid stream, transferring heat from the rich slightly wet vapor stream to the condensed higher pressure working fluid stream in a fifth heat exchange unit to form a heated condensed higher pressure working fluid stream, and increasing a pressure of the heated condensed higher pressure working fluid stream to form the increased pressure condensed working fluid stream, where the intercooler portion of the heat recovery and vapor generator subsystem permits a working fluid flow rate to be increased relative to a flow rate of the exhaust stream resulting in a bottoming cycle gross output increase of at least 23% relative to a dual pressure Rankine cycle bottoming cycle, a bottoming cycle net output increase of at least 25% relative to a dual pressure Rankine cycle bottoming cycle, a combined cycle net output increase of at least 5.5% relative to a dual pressure Rankine cycle bottoming cycle, and a combined cycle efficiency increase of at least 54% relative to 51.1% for a dual pressure Rankine cycle bottoming cycle.

8. The method of claim 7, wherein the working fluid comprises a multi-component fluid including at least one lower boiling point component and at least one higher boiling point component, where the components are selected from the group consisting of an ammonia-water mixture, a mixture of two or more hydrocarbons, a mixture of two or more freons, and a mixture of hydrocarbons and freons.

9. The method of claim 8, wherein the multi-component fluid comprises a mixture of water and ammonia.

* * * * *